Oct. 3, 1939.  L. A. LEPPKE  2,174,586
SERVING DEVICE
Filed July 26, 1937   2 Sheets-Sheet 1

INVENTOR.
LOUIS A. LEPPKE.
BY John C. Baisch
ATTORNEY.

Oct. 3, 1939.   L. A. LEPPKE   2,174,586
SERVING DEVICE
Filed July 26, 1937   2 Sheets-Sheet 2
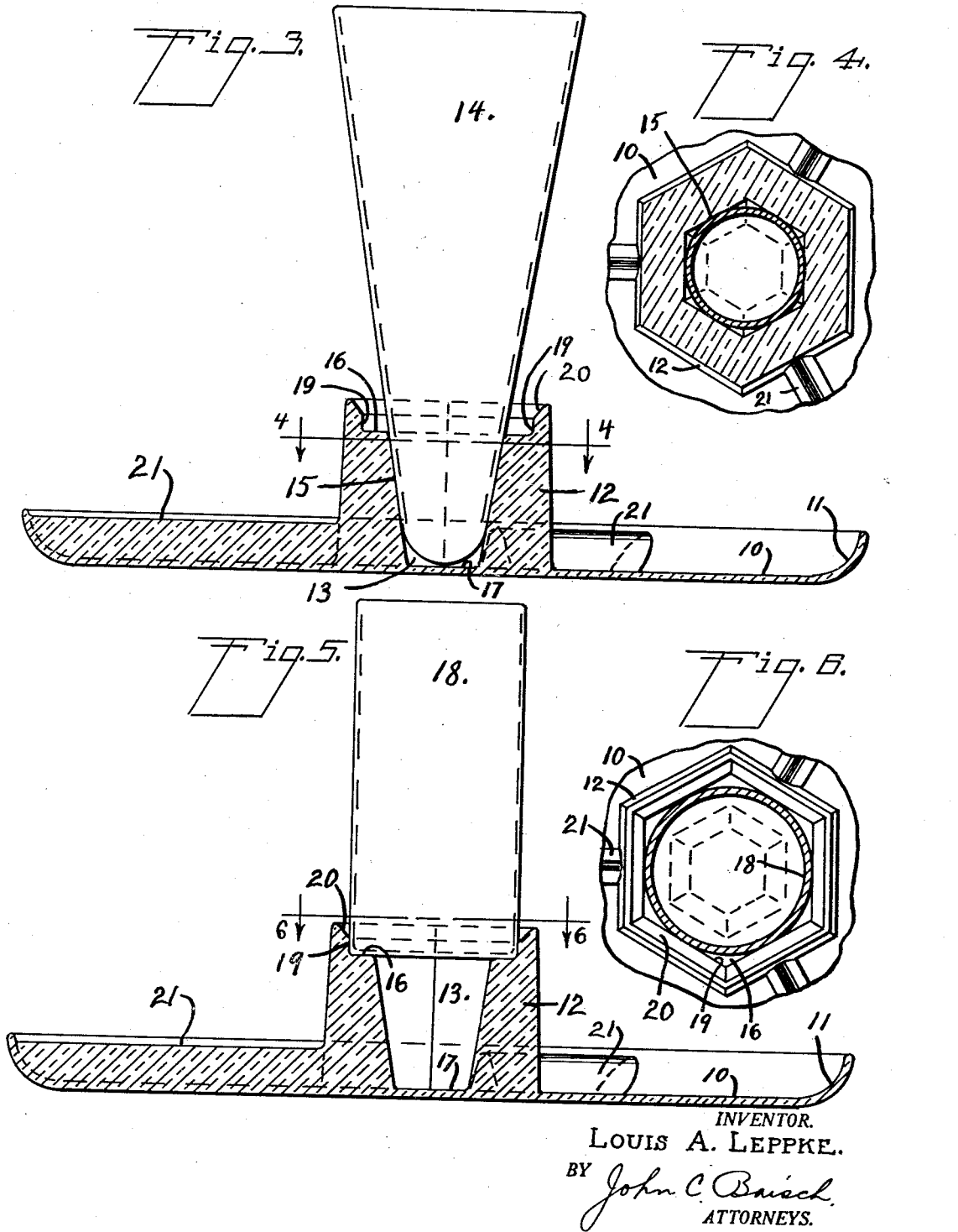
INVENTOR.
LOUIS A. LEPPKE.
BY John C. Baisch
ATTORNEYS.

Patented Oct. 3, 1939

2,174,586

UNITED STATES PATENT OFFICE 2,174,586

SERVING DEVICE

Louis A. Leppke, Omaha, Nebr.

Application July 26, 1937, Serial No. 155,727

2 Claims. (Cl. 65—15)

This invention relates generally to serving devices and particularly to serving devices having a holding member for cups, glasses and the like of various types and shapes.

In trays of this type it is necessary to provide means for permitting condensed water vapor on the outside of the beverage container or glass used in connection with the tray or serving device to drain away without running onto food in said device and to provide means whereby suction in the holding member, between said member and beverage container, is eliminated or negatived.

It is therefore an important object of my invention to provide a device of this character wherein means is provided for collecting condensation on the beverage container and draining it into the bottom of the holding member.

It is another object of my invention to provide, in a device of this character, a holding member having means whereby suction between the beverage container and said holding member is eliminated, thus permitting the beverage container to be easily removed from said holding member without undue resistance to such removal.

It is a further object of the invention to provide a device of this character having a holding member adapted to receive glasses or beverage containers of various types or shapes.

It is a further object of the invention to provide drainage of condensation on the outside of the beverage containers regardless of the type of container used in the holding member.

Another object is to provide a device of this character that may be molded or cast of suitable material.

Still another object of the invention is to provide a device of this character of simple and durable construction and of low manufacturing cost.

Numerous other objects and advantages of this invention will be apparent as it is better understood from the following detailed description, which, taken in connection with the accompanying drawings, discloses a preferred embodiment thereof.

Referring to the drawings:

Figure 3 is a view similar to Figure 2 but with a tapering or conical glass received in the holding member.

Figure 4 is a partial horizontal section taken on line 4—4 of Figure 3.

Figure 5 is a view similar to Figure 2 but with a cylindrical type of glass received in the holding member.

Figure 6 is a partial horizontal section taken on line 6—6 of Figure 5.

Figure 1:
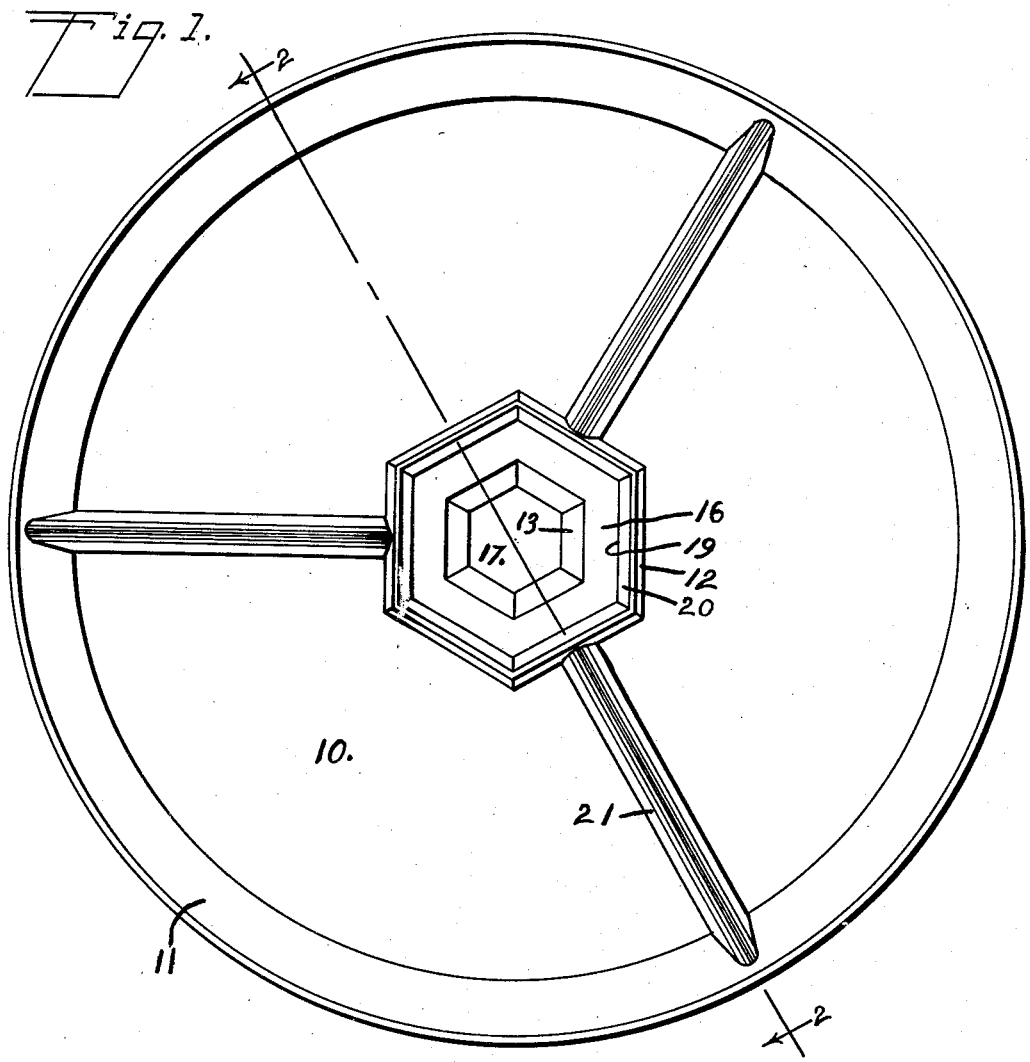
Figure 1 is a plan view of my serving device without a glass in the holding member.
Figure 2:
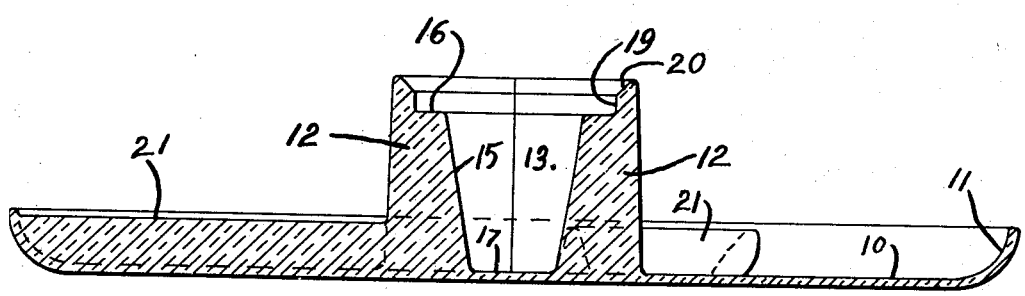
Figure 2 is a vertical section through same taken on line 2—2 of Figure 1.

Referring more particularly to the drawings, which illustrate a preferred embodiment of the invention, reference numeral 10 indicates the plate or tray portion of the device generally. The plate is provided with a curved upturned peripheral edge portion 11 and centrally in said plate is a holding member for glasses or beverage containers. The holding member, referred hereto by reference numeral 12, is six sided and the respective sides taper slightly inwardly from the bottom to the top so that the holding member is slightly larger at the bottom than it is at the top. Centrally in the holding member is a six sided opening 13, smaller at the bottom than at the top thereby providing a downwardly and inwardly tapering socket for reception of a conical glass 14, the glass touching each side of the opening 13 centrally thereof transversely of its width and also down the longitudinal center thereof as indicated at 15 in Figure 4. Thus at the corners where the respective sides join channel spaces are provided to the bottom of the socket which permit the free movement of air thereto and prevent any suction when the glass is removed from the socket.

At the upper end of the socket the holding member is provided with a shoulder 16 extending outwardly of the open end of said socket, the lower end of same being closed by a wall 17, to provide a six sided base for supporting a cylindrical glass 18 as shown in Figure 5. Short vertical walls 19 extending upwardly of the shoulder 16 in the form of a hexagon in horizontal cross-section and adjacent the top of the holding member said walls are inclined outwardly at 20. The plate is divided by partitions or ribs 21 which extending from the holding member radially to the upturned edge 11 of said plate.

The socket of the holding member slidably receives cone shaped glass 14 and supports same in an upright position. Condensed moisture on the outside of glass 14 may run down the side of the glass or drip into the shouldered portion of the holding member and from there run into the bottom of the socket along the corner portions thereof.

Should it be desired to use cylindrical glass 18 with the device said glass is received in the shouldered portion of the holding member as shown in Figures 5 and 6. The sides of the glass 18 may contact the respective sides of walls 19 at the central portions thereof as indicated as 21 in Figures 5 and 6, said walls being in tangential association with the glass. The beveled portions 20 of the walls extend outwardly of the cylindrical plane of the glass 18 and are adapted to catch condensed moisture on the outside of said glass, said moisture running down into the shouldered portion into the space between said glass and walls 19 at the corners thereof. When the glass is removed, as for drinking therefrom, such collected moisture will run down into the socket.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

Having thus described my invention what I claim is:

1. The herein described device comprising in combination, a plate having a central integrally formed hexagonal supporting member upstanding therefrom a distance substantially greater than the thickness of the plate, said member tapering slightly inwardly from the bottom to the top and having a hexagonal socket therein closed at the bottom, said socket being larger at the top than at the bottom and adapted to receive a cone-shaped glass an outwardly extending hexagonal shoulder in the supporting member at the upper end of the socket, upwardly extending walls about the shoulder, one wall for each side thereof, said wall being inclined upwardly and outwardly adjacent the top thereof, and a plurality of ribs extending radially from the supporting member and formed integrally with the device.

2. The herein described device comprising a plate having a central integrally formed supporting member upstanding therefrom a distance substantially greater than the thickness of the plate, said member having a hexagonal socket therein closed at the bottom, said socket being larger at the top than at the bottom, an outwardly extending horizontal hexagonal shoulder in the supporting member about the upper end of the socket, and upwardly extending walls about said shoulder, one wall for each side of said shoulder.

LOUIS A. LEPPKE.